(12) United States Patent
Kreft et al.

(10) Patent No.: US 9,346,094 B2
(45) Date of Patent: May 24, 2016

(54) AUTOMATIC INDEXING DIMPLER

(71) Applicant: Welker Engineered Products Company, Troy, MI (US)

(72) Inventors: G. Scott Kreft, Troy, MI (US); Timothy N. Thomas, Troy, MI (US)

(73) Assignee: Welker Engineered Products Company, Troy, MI (US)

( * ) Notice: Subject to any disclaimer, the term of this patent is extended or adjusted under 35 U.S.C. 154(b) by 0 days.

(21) Appl. No.: 14/862,966

(22) Filed: Sep. 23, 2015

(65) Prior Publication Data

US 2016/0082497 A1     Mar. 24, 2016

Related U.S. Application Data

(60) Provisional application No. 62/054,164, filed on Sep. 23, 2014.

(51) Int. Cl.
    *B21D 22/04*      (2006.01)
    *B23Q 5/34*      (2006.01)

(52) U.S. Cl.
    CPC ............... *B21D 22/04* (2013.01); *B23Q 5/347* (2013.01)

(58) Field of Classification Search
    CPC ................................. B21D 22/04; B23Q 5/347
    USPC ............................................................ 72/447
    See application file for complete search history.

(56) References Cited

U.S. PATENT DOCUMENTS

| | | | | | |
|---|---|---|---|---|---|
| 2,365,918 | A | * | 12/1944 | Tuttle ..................... | B21D 22/04 713/133 |
| 2,374,019 | A | * | 4/1945 | Kahler et al. .......... | B21D 22/04 173/114 |
| 2,421,732 | A | * | 6/1947 | Albert et al. ........... | B21D 22/04 72/313 |

* cited by examiner

*Primary Examiner* — David B Jones
(74) *Attorney, Agent, or Firm* — Young Basile Hanlon & MacFarlane P.C.

(57) ABSTRACT

An automatic indexing dimpler includes a housing having an interior channel substantially centered along a longitudinal axis. A cam is slidably and rotatably disposed within the interior channel. The cam includes a first longitudinal groove, a second longitudinal groove and an angled groove adjoining the first longitudinal groove at a groove bottom end and the second longitudinal groove at a groove top end. Each longitudinal groove defines a discrete indexing position. A cam follower attached to the housing engages the first and second longitudinal grooves and the angled groove to operably rotate the cam about the longitudinal axis as the cam follower tracks along the angled groove from the groove bottom end to the groove top end. At least one dimple engagable with a workpiece and operable for forming a recessed region in the workpiece is operably connected to the cam for concurrent movement therewith.

19 Claims, 14 Drawing Sheets

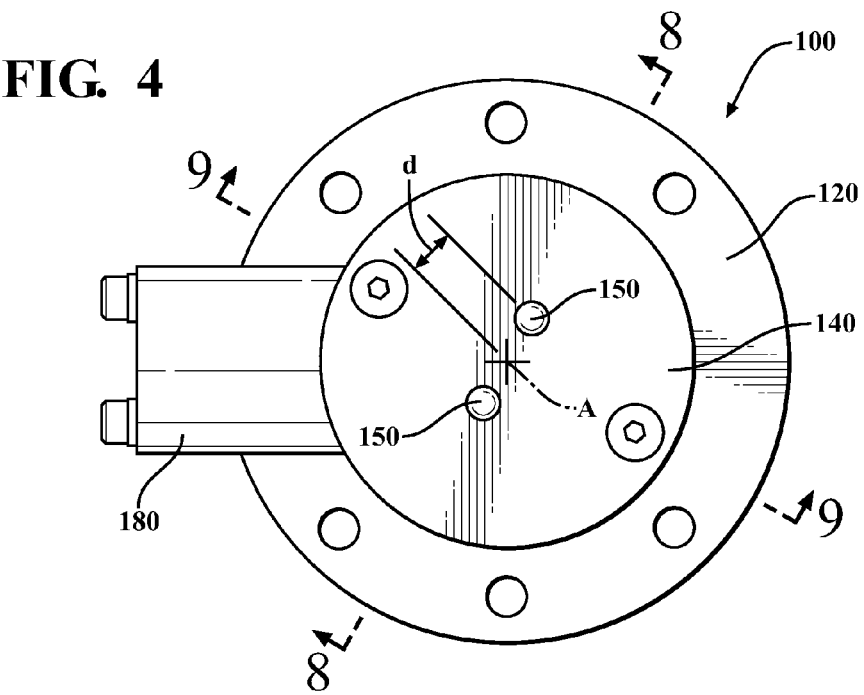
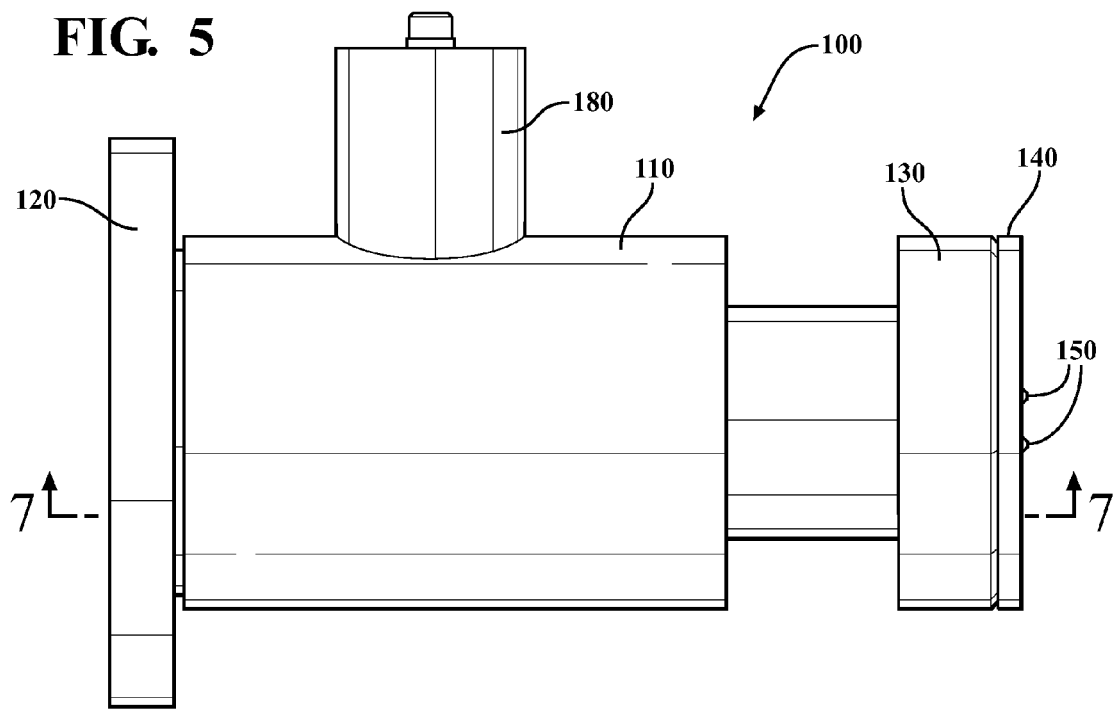

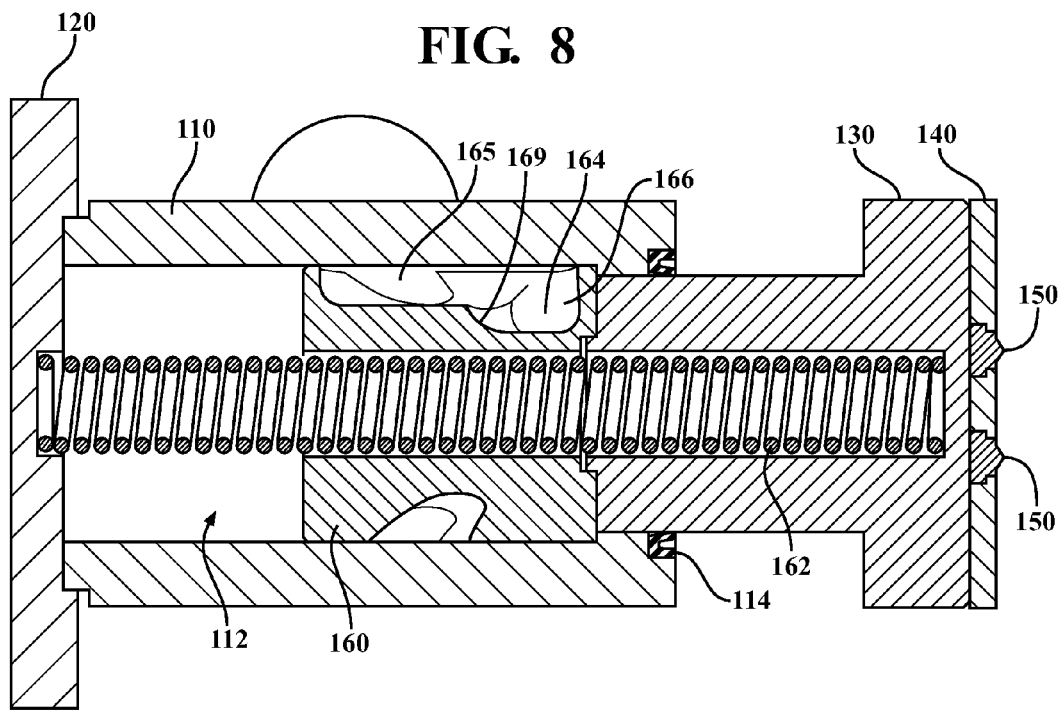
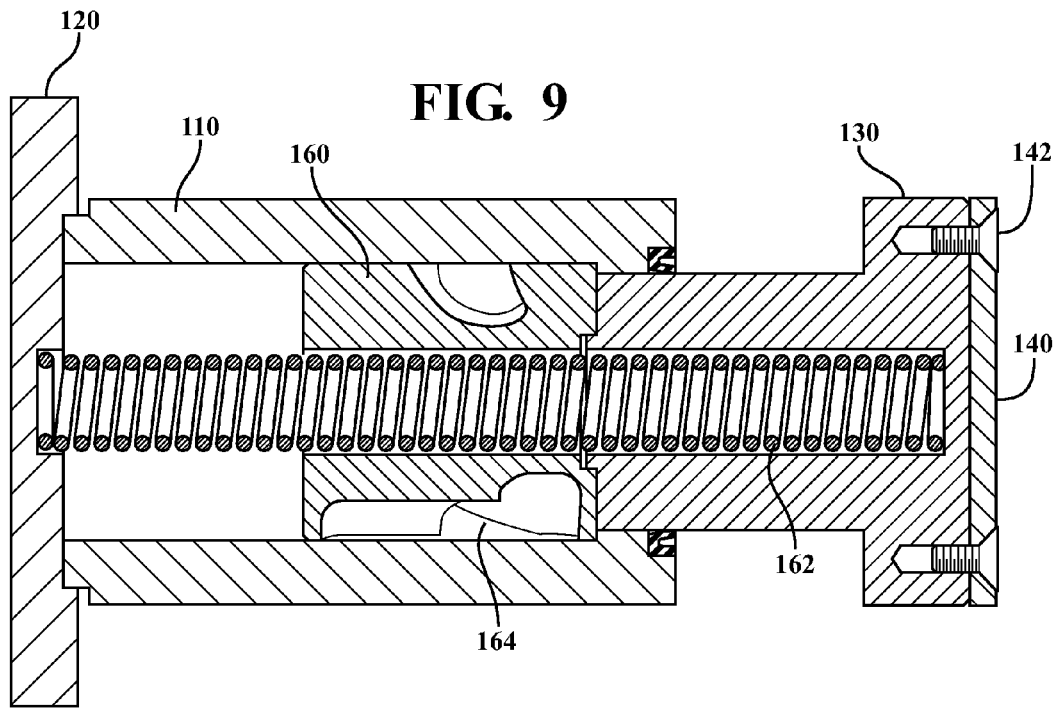

ously nested together. Workpieces may be stacked following a stamping operation.

AUTOMATIC INDEXING DIMPLER

RELATED APPLICATIONS

This application claims the benefit of U.S. Provisional Ser. No. 62/054,164, filed on Sep. 23, 2014, which is herein incorporated by reference in its entirety.

BACKGROUND

Die stamping manufacturing processes typically involve cutting and forming metal blanks using a variety of dies. A blanking die may be used to produce a sheet metal blank from an initially coiled piece of material, which may be subsequently formed to a desired shape in a stamping operation. Multiple stamped metal workpieces may be stacked following a stamping operation. Depending on the configuration of the stamped part, the closely stacked workpieces may tend to nest together, thus causing difficulty when subsequently attempting to separate the stacked workpieces.

SUMMARY OF THE DISCLOSURE

Disclosed herein are aspects, features, elements, and implementations of an automatic indexing dimpler that may be employed in stamping operations. The automatic indexing dimpler may include a dimpler housing and a base plate attached to the dimpler housing. A dimpling portion may include a piston with a dimpling end plate attached to the piston. One or more raised dimples protrude from the end plate. The piston may be configured to move relative to the dimpler housing and base plate. The automatic indexing dimpler may employ a cam operably connected to the end plate. The cam may include a set of cam grooves for receiving a cam follower. The cam follower may be configured to track within the cam grooves so as to cause the cam and end plate to rotate in discrete increments about a longitudinal axis of the cam as the piston and end plate are moved in a longitudinal direction.

BRIEF DESCRIPTION OF THE DRAWINGS

The various features, advantaged and other uses of the present apparatus will become more apparent by referring to the following detailed description and drawings in which:

FIG. 4 is an end view of the dimpler of FIG. 1 illustrating a pair of dimpler buttons;

FIG. 5 is side view of the dimpler of FIG. 1;

FIG. 8 is a partial sectional view of the dimpler of FIG. 1 taken along section line 8-8 of FIG. 4;

FIG. 9 is a partial sectional view of the dimpler of FIG. 1 taken along section line 9-9 of FIG. 4;

DETAILED DESCRIPTION

Figure 1:
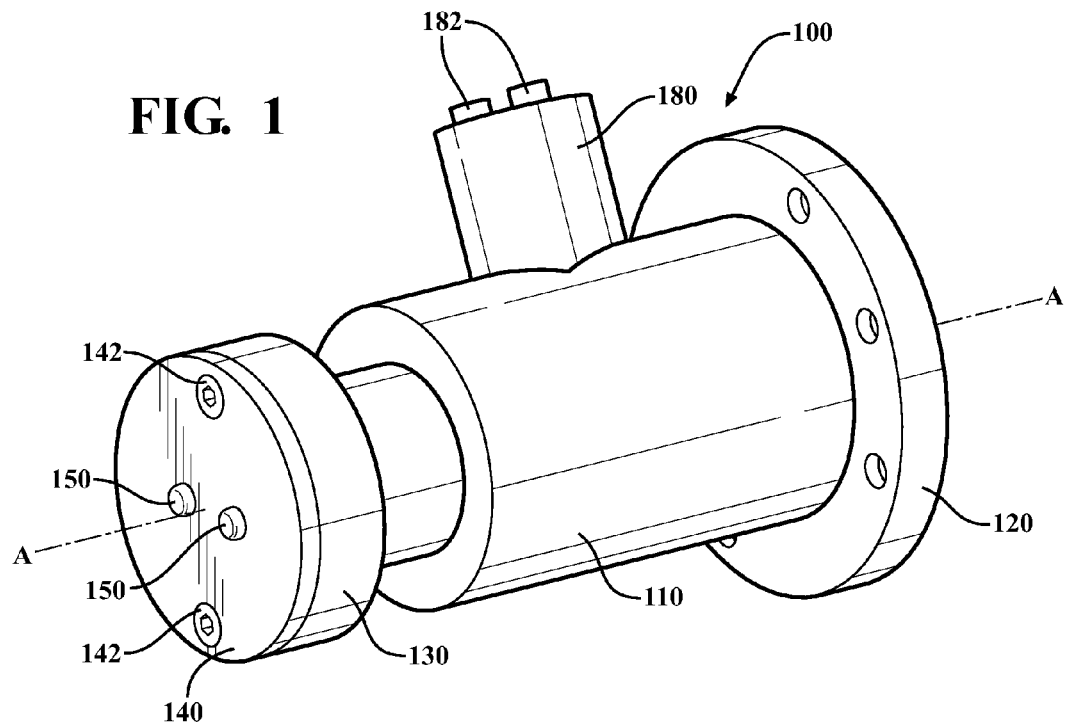
FIG. 1 is a perspective view of an exemplary automatic indexing dimpler.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Illustrative examples of an automatic indexing dimpler are described herein. The dimpler may be configured to create a dimpled impression in a portion of a workpiece undergoing a stamping operation. The dimpler may automatically index to change a position of dimples between operations. The dimpler may be cycled between an extended position and a compressed position during operation. The dimpler includes a cam and cam follower assembly that causes a piston portion to index, and rotate, in relation to a dimpler housing, as the piston moves between the compressed position and an extended position. The dimples may change position and orientation upon each indexing sequence. The change in orientation of the dimples allow for finished adjacently stacked workpieces to have dimples located at different positions on the respective workpieces. The dimples create a space between consecutively stacked sheet metal blanks that prevent the sheet metal blanks from sticking together when stacked.

With reference to FIGS. 1-5, an exemplary automatic indexing dimpler 100 generally may include a dimpler housing 110, a base plate 120, a piston 130, a face plate 140, dimples 150, a cam 160 (see for example FIG. 2), a cam follower 170 (see for example FIG. 2), and a cam follower housing 180. Piston 130 may be configured to travel between an extended position, as illustrated for example in FIG. 3, and a compressed position, as illustrated for example in FIG. 22.

Figure 2:
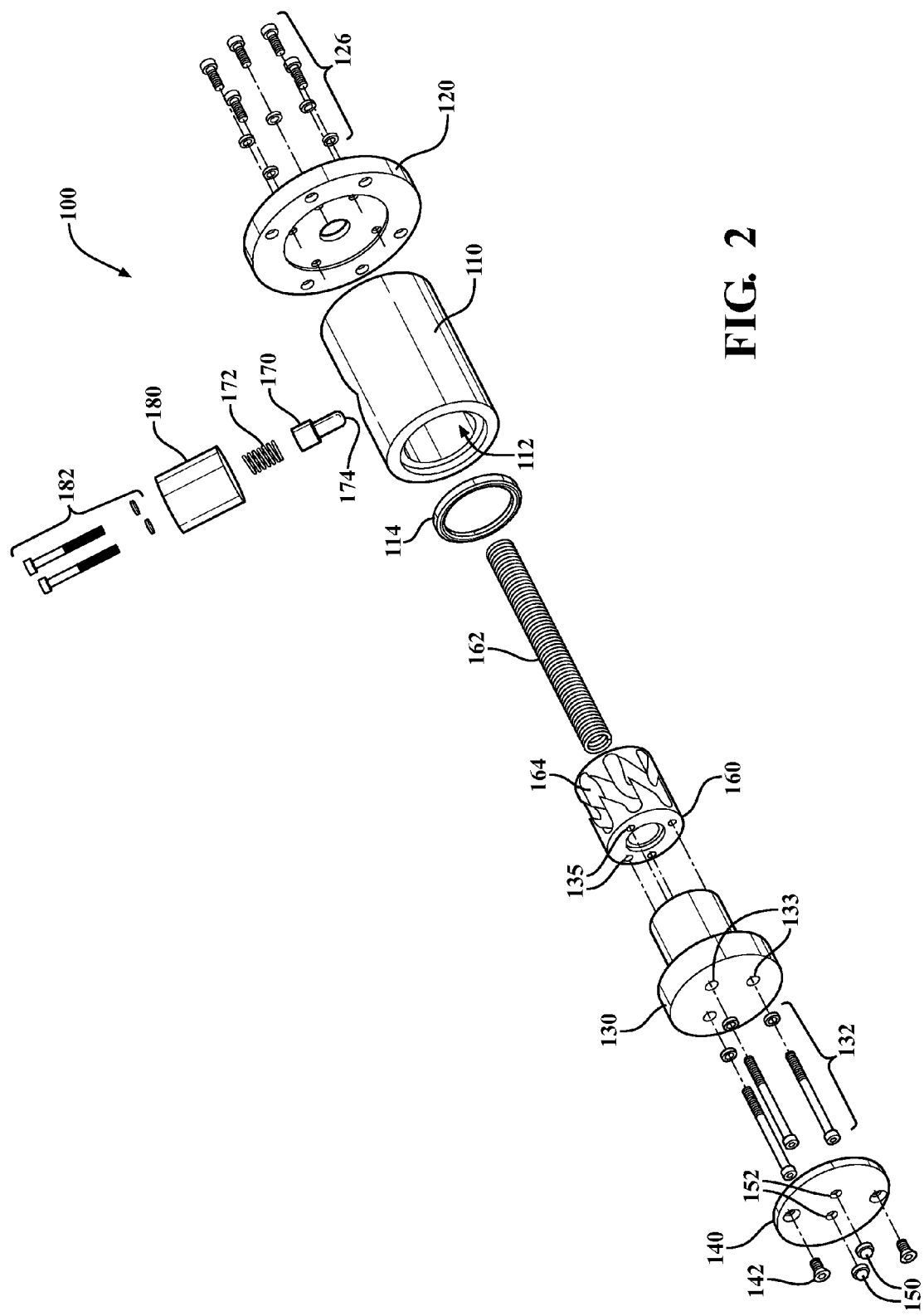
FIG. 2 is an exploded perspective view of the dimpler of FIG. 1.

With particular reference to FIG. 2, housing 110 may be secured in abutment to base plate 120 using base plate fasteners 126. Base plate 120 may alternatively be integrally formed with housing 110. Housing 110 may include an interior channel 112 for receiving cam 160, a cam biasing member 162, and a portion of piston 130. A housing seal 114 may be attached to housing 110 opposite base plate 120 to provide a seal between the housing 110 and the piston 130. Housing 110 may further include an aperture 116 configured to receive a portion of cam follower 170.

In the exemplary configuration of dimpler 100, piston 130 may be secured in abutment to face plate 140 by face plate fasteners 142. Dimples 150 project outward from face plate 140 and may be secured to face plate 140 by trapping the dimples 150 between piston 130 and face plate 140. The dimples 150 may be offset a distance "d" from a longitudinal axis A of the dimpler 100. Each dimple 150 may be offset from the longitudinal axis A by substantially the same distance "d" or one or more dimples may be offset by a different distance.

Piston 130 may be secured in abutment to cam 160 by cam fasteners 132. Cam 160 and piston 130 are fixedly attached to one another so as to move in unison with one another. The cam 160 and piston 130 are both concurrently rotatable about and moveable axially along the longitudinal axis A.

Figure 3:
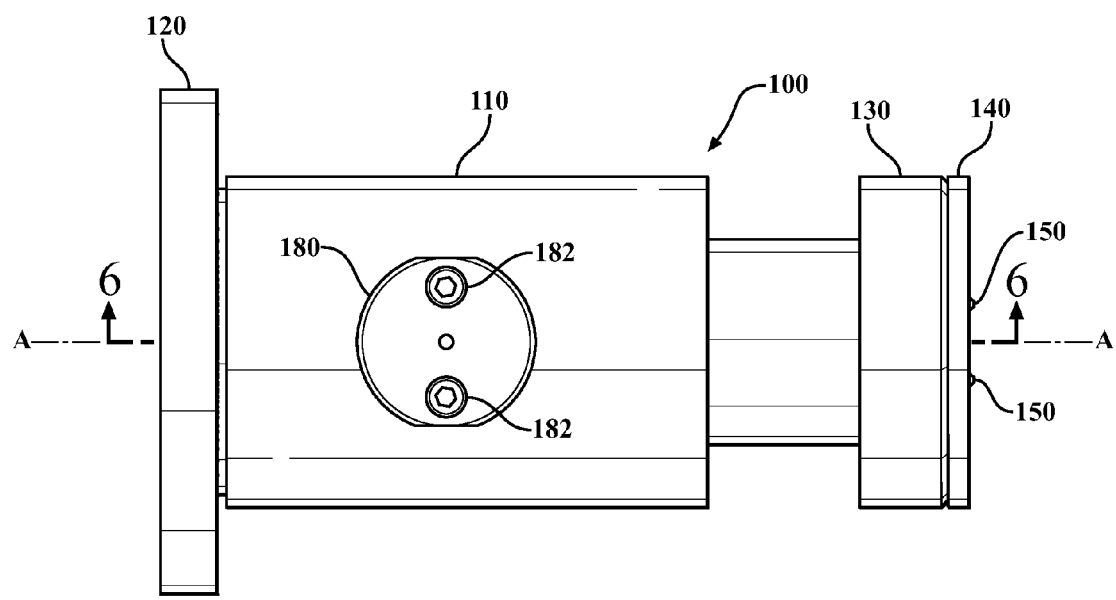
FIG. 3 is side view of the dimpler of FIG. 1.
Figure 6:
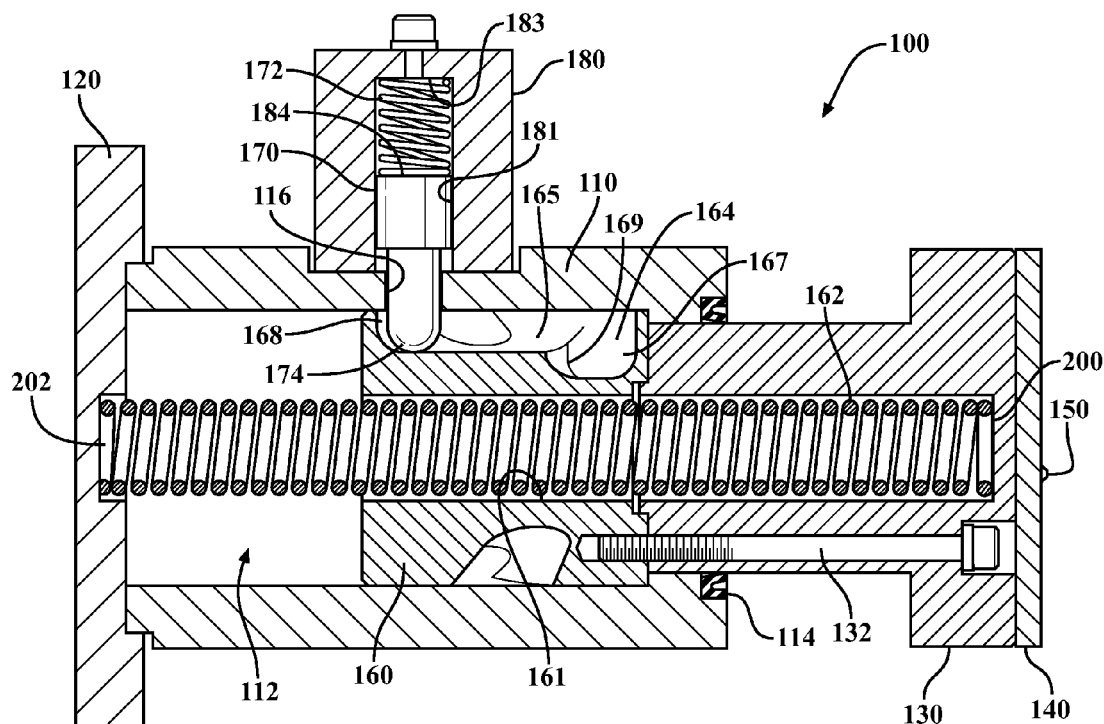
FIG. 6 is a partial sectional view of the dimpler of FIG. 1 taken along section line 6-6 of FIG. 3.
Figure 7:
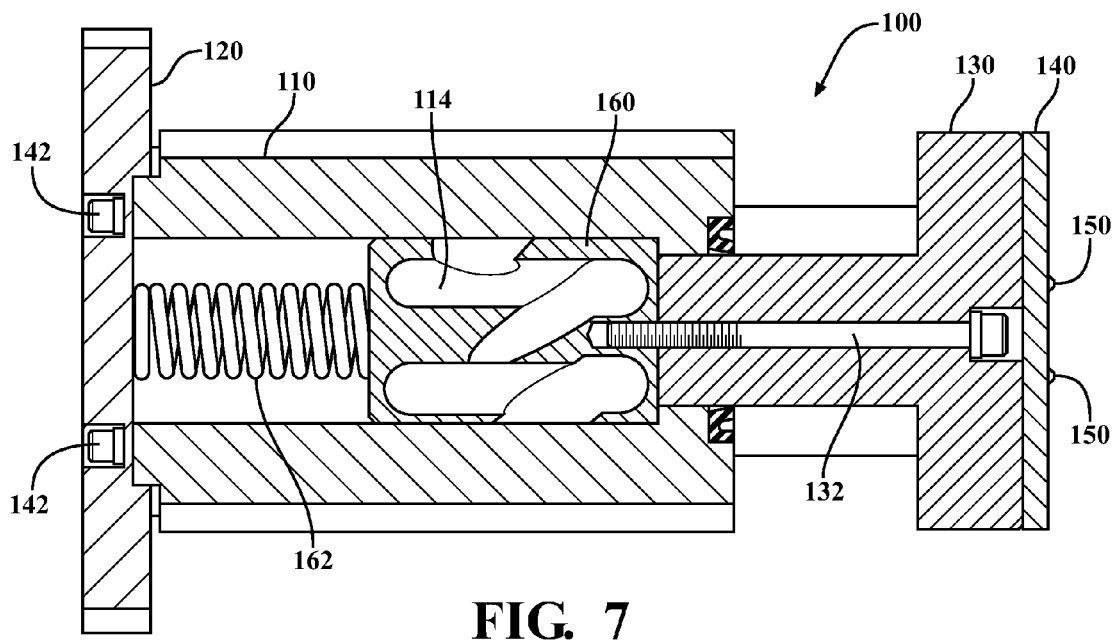
FIG. 7 is a partial sectional view of the dimpler of FIG. 1 taken along section line 7-7 of FIG. 5.
Figure 10:
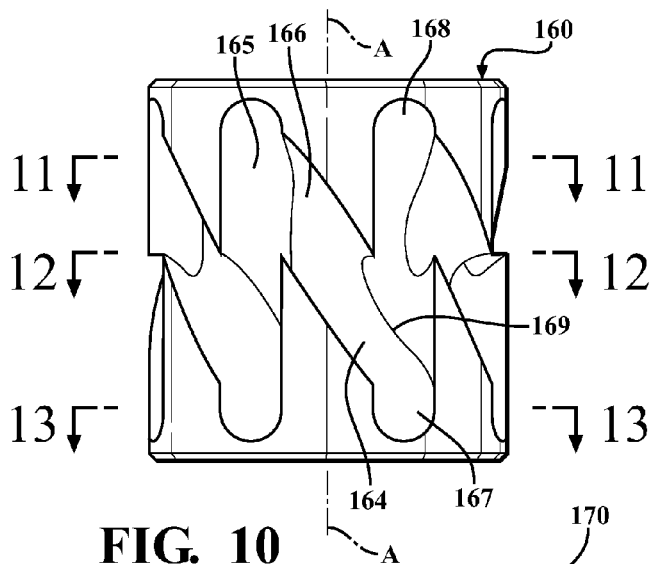
FIG. 10 is a side view of an exemplary dimpler cam.

With continued reference to FIGS. 2, 3 and 6, cam follower 170 includes a cam follower end 174 that may be biased into engagement with cam 160 by a cam follower biasing member 172. A cam follower housing 180 may be configured for attachment to housing 110 by fasteners 182. Follower housing 180 may include a cam follower channel 181 that slidably receives cam follower biasing member 172 and at least a portion of cam follower 170. Follower housing 180 may be fixedly attached to housing 110 and may extend substantially perpendicular to longitudinal axis A of dimpler 100 (see for example FIG. 1). It is contemplated that fasteners 126, 132, 142, and 182 may include bolts, crews, clips, pins, adhesive, joining material, or any other fastening devices suitable for the application.

Referring to FIGS. 2 and 6-9, cam 160 may be slidably and rotatable disposed within the interior channel 112 of housing 110 and may be configured to move rotationally about longitudinal axis A as well as translationally along longitudinal axis A. The piston 130 may be fixedly secured to cam 160 by cam fasteners 132 that extend through apertures 133 in the piston 130 and threadably engage apertures 135 in cam 160.

The cam biasing member 162 operates to bias the piston toward the extended position. The cam 160 may include a thru aperture 163 that extends an entire axial length of the cam 160. Aperture 163 may be sized to allow cam biasing member 162 to fit within aperture 163. Aperture 163 may be centered on longitudinal axis A. The cam biasing member 162 may be arranged to extend through the aperture 163 with one end 200 of the cam biasing member engaging the piston 130 and an opposite end 202 engaging the base plate 120. Thus, piston 130 may be biased towards the extended position, and cam biasing member 162 may resist movement of piston 130 towards the compressed position. In the illustrated exemplary configuration cam biasing member 162 is configured as a conventional coil spring, but in practice other biasing devices may also be employed, such as, for example, a gas, hydraulic or electro-magnetic spring.

Referring particularly to FIG. 6, cam follower 170 may be biased toward an interior of housing 110 by cam follower biasing member 172. One end of cam follower biasing member 172 contacts an inside surface 183 of cam follower housing 180 and an opposite end contacts an end surface 184 of the cam follower 170. In the illustrated exemplary configuration cam follower biasing member 172 is configured as a conventional coil spring, but in practice other biasing devices may also be employed, such as, for example, a gas, hydraulic or electro-magnetic spring.

With reference to FIGS. 2 and 8, dimples 150 may be configured separate from face plate 140, and may be configured to fit within and extend beyond dimple apertures 152 defined in face plate 140. Dimples 150 may be retained in dimpler 100 by trapping the dimples 150 between piston 130 and face plate 140 when face plate 140 is attached to piston 130. In the illustrated exemplary configuration, dimples 150 are shown to include a rounded conical end, but various different shapes and sizes may also be employed. In addition, the material of dimples 150 may vary and may be chosen based at least in part on the requirements of the particular application. Dimples 150 may alternately be integrally formed with face plate 140 or piston 130.

With reference to FIGS. 10-15, cam 160 may include a set of cam grooves 164 defined therein. Cam grooves 164 may include multiple longitudinal grooves 165 and multiple angled grooves 166 extending between and adjoining the longitudinal grooves 165. Longitudinal grooves 165 may be aligned substantially parallel to longitudinal axis A and substantially parallel to one another. Angle grooves 166 may be oriented at an oblique angle relative to longitudinal axis A. Cam grooves 164 may further include a groove bottom end 167 and groove top end 168 (as viewed from the perspective of FIG. 10) generally coinciding with the locations at which the longitudinal grooves 165 adjoin the angled grooves 166.

Longitudinal grooves 165 may be defined in cam 160 to extend in a direction generally parallel to longitudinal axis A from groove bottom end 167 to groove top end 168. Each longitudinal groove 165 defines a discrete indexing point of the dimpler 100. The total number of longitudinal grooves 165 (e.g., indexing points) preferably is a prime number to minimize potential nesting of the dimpled workpieces.

Angled grooves 166 may extend from a groove bottom end 167 associated with one longitudinal groove 165 to a groove top end 168 associated with an immediately adjacent longitudinal groove 165. Angled grooves 165 may be angle relative to longitudinal groove 165.

Figure 23:
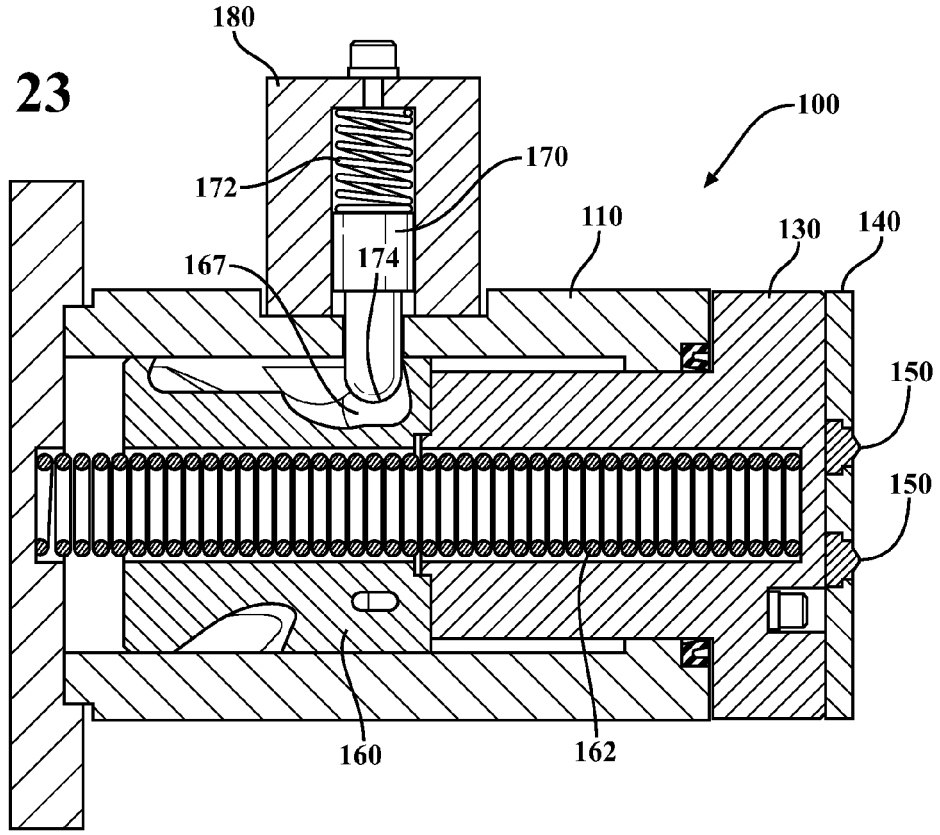
FIG. 23 is a partial sectional view of the dimpler of FIG. 1 taken along section line 23-23 of FIG. 22.
Figure 25:
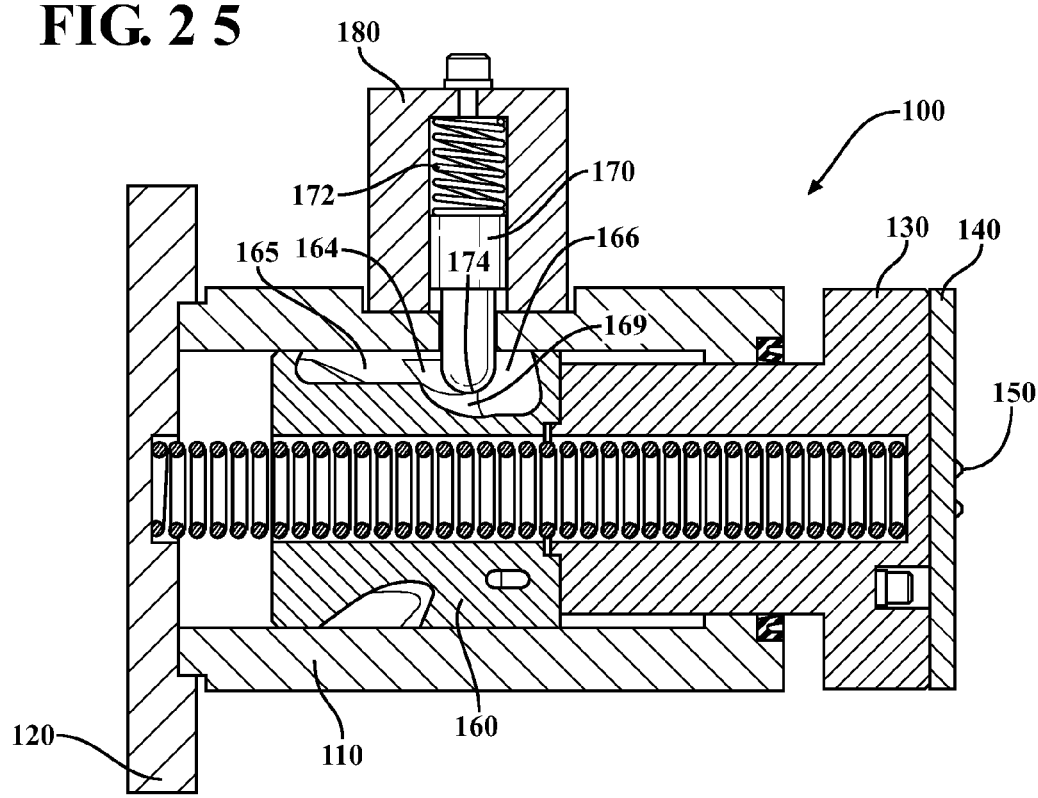
FIG. 25 is a partial sectional view of the dimpler of FIG. 1 taken along section line 25-25 of FIG. 24.

Cam follower end 174 of cam follower 170 may be configured to track in cam grooves 164 during the indexing sequence, as shown, for example, in FIGS. 23 and 25. As illustrated, for example, in FIGS. 11-13, cam follower end 174 of cam follower 170 may contact one or more surfaces of cam grooves 164. Cam follower end 174 may be shaped to generally match a contour of cam grooves 164. In the illustrated exemplary configuration shown in FIGS. 10-15, cam grooves 164 and cam follower end 174 may include mating, rounded or angled surfaces.

The depths of cam grooves 164 may vary along a length of the grooves. Longitudinal grooves 165 may have a substantially uniform depth from groove top end 168 until a point at which longitudinal groove 165 adjoins angled groove 166 at groove bottom end 167. Groove bottom end 167 may have a depth greater than groove top end 168, and angled grooves 166 may have a depth that gradually decreases from groove bottom end 167 to groove top end 168. The change in depth occurring along longitudinal groove 165 may occur abruptly at the location where longitudinal groove 165 adjoins angled groove 166 near groove bottom end 167. The generally abrupt change in depth produces a step 169 where longitudinal groove 165 adjoins angled groove 166. The depth of the cam grooves 164 may abruptly change at step 169 from the shallower groove depth occurring at groove end 168 to the deeper groove depth occurring at groove bottom end 167.

Figure 11:
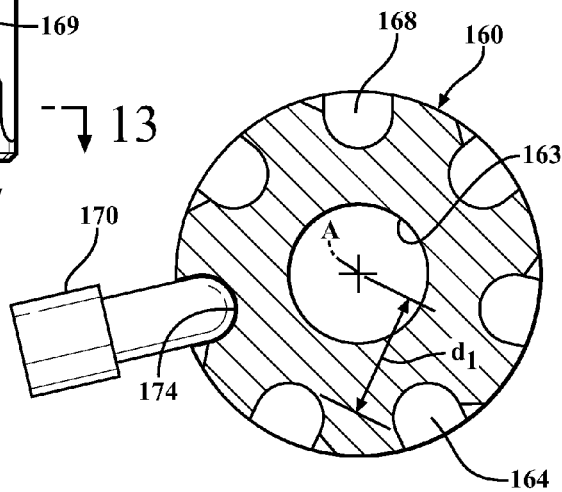
FIG. 11 is a partial sectional view of the dimpler cam of FIG. 10 taken along section line 11-11 of FIG. 10.
Figure 12:
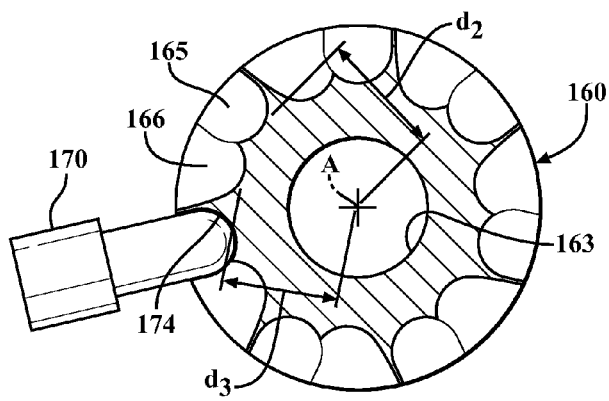
FIG. 12 is a partial sectional view of the dimpler cam of FIG. 10 taken along section line 12-12 of FIG. 10.
Figure 13:
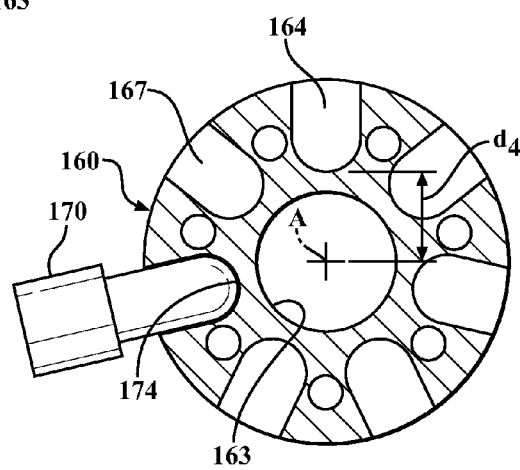
FIG. 13 is a partial sectional plan view of the dimpler cam of FIG. 10 taken along section line 13-13 of FIG. 10.
Figure 14:
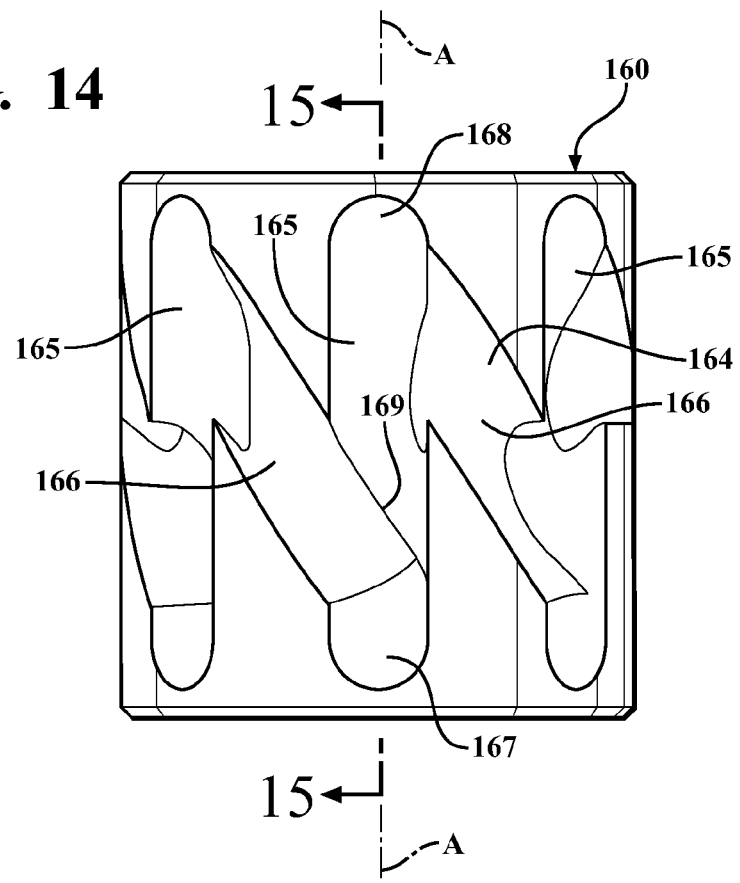
FIG. 14 is a side view of the dimpler cam of FIG. 10.
Figure 15:
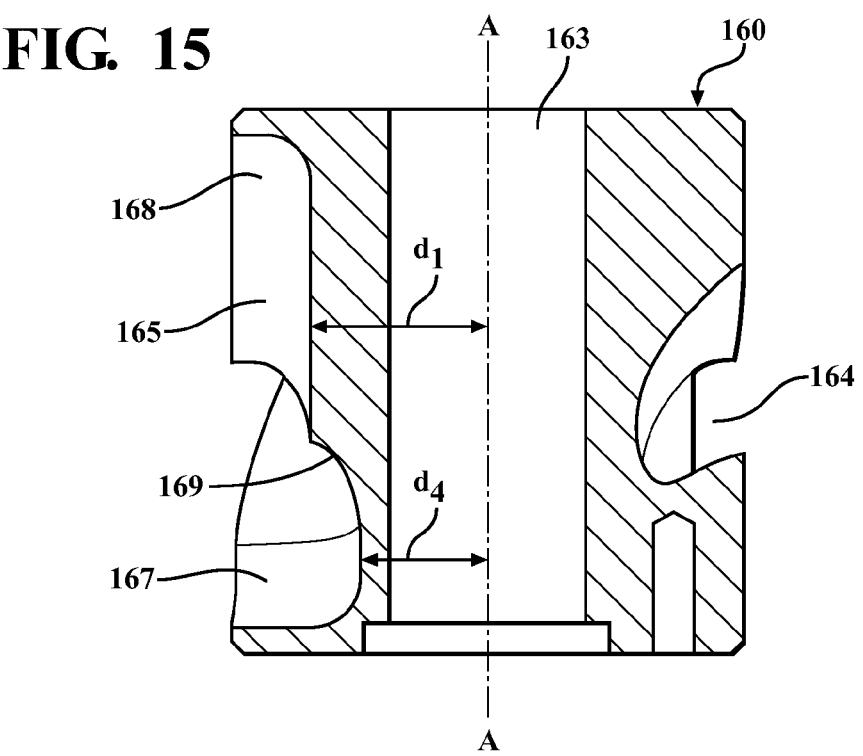
FIG. 15 is a partial sectional view of the dimpler cam of FIG. 10 taken along section line 15-15 of FIG. 14.
Figure 16:
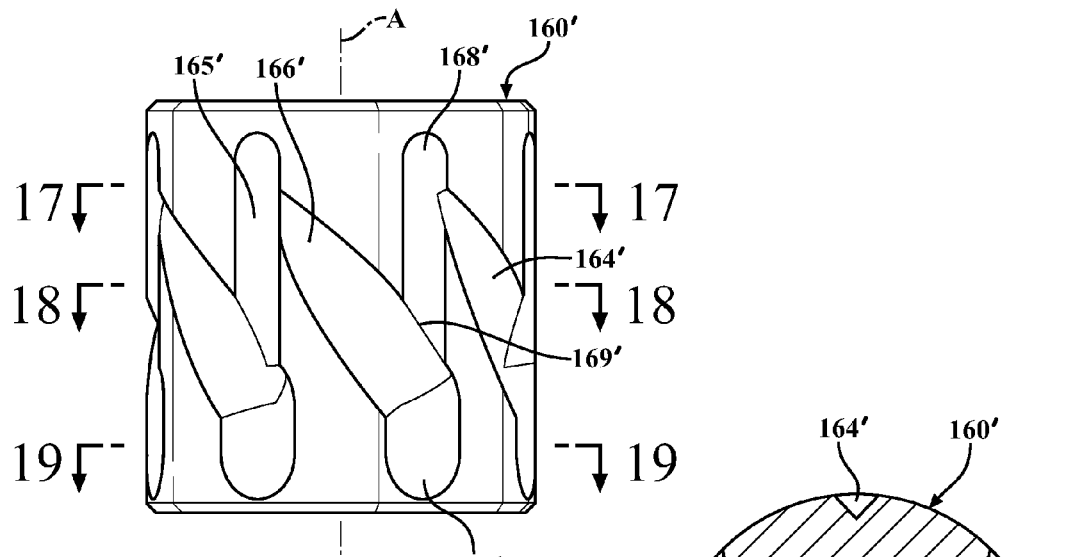
FIG. 16 is a front of an alternatively configured dimpler cam.

FIGS. 11-13 each illustrate a partial sectional view of cam 160 along with cam follower 170. FIG. 11 illustrates cam follower end 174 positioned within longitudinal groove 165 proximate to groove top end 168. Groove top end 168 may have a groove depth such that a groove distance d1 can be defined as the distance between longitudinal axis A and cam groove 164.

FIG. 12 illustrates cam follower end 174 positioned in longitudinal groove 165 at a location between groove bottom end 167 and groove top end 168. Both longitudinal grooves 165 and angled grooves 166 are viewable in FIG. 12. Longitudinal grooves 165 have a groove distance d2 from longitudinal axis A and angled grooves 166 have a groove distance d3 at the axial location of cross-section 12-12. In configurations in which longitudinal grooves 165 have a constant depth, groove distance d2 may be the same as groove distance d1. Angled groove 166 may have a greater depth than longitudinal groove 165 at this cross-sectional location, thus groove distance d3 may be less than groove distance d2.

FIG. 13 illustrates cam follower end 174 positioned at groove bottom end 167. Groove distance d4 of groove bottom end 167 from longitudinal axis A is less than the groove distances d1 and d2 of longitudinal groove 165. The depth of cam grooves 164 may be greatest at groove bottom end 167. Cam follower 170 tracks downward (as viewed from the perspective of FIG. 10) along longitudinal groove 165 as the piston 130 is moved from the extended position to the compressed position, as illustrated for example, in FIGS. 22 and 23. When piston 130 is at or near the fully compressed position, cam follower end 174 is positioned at or near the deeper groove bottom end 167. Due to the biasing force of cam follower biasing member 172, cam follower end 174 may move in a direction substantially perpendicular to longitudinal axis A to maintain contact with cam grooves 164 as the depth of cam grooves 164 varies. The cam follower biasing member 172 biases the cam follower 170 radially inward to enable cam follower end 174 to maintain contact with the groove surface as the cam follower 170 passes over the step 169. With piston 130 arranged in the compressed position and cam follower end 174 positioned at the groove bottom end 167, moving piston 130 axially from compressed position toward the extended position causes the cam follower 170 to travel along angled groove 166 toward groove top end 168. Because of the change in depth occurring at step 169 when transitioning from longitudinal groove 165 to angled groove 166, cam follower 170 is guided along angled groove 166 rather than longitudinal groove 165 as piston 130 is moved from the compressed position toward the extended position. Cam follower 170 moves gradually outward in a radial direction as the depth of angled groove 166 becomes shallower moving from groove bottom end 167 toward groove top end 168.

FIGS. 16-21 illustrate an alternatively configured cam 160' for use in dimpler 100. Cam 160' may be similarly configured as cam 160, except that the grooves in cam 160' may have a generally cone-shaped cross-sectional contour, rather than the generally curved cross-sectional contour of cam grooves 164. Cam 160' may include an aperture 163' defined therein along longitudinal axis A of dimpler 100. Aperture 163' may be sized to allow cam biasing member 162 to fit within aperture 163'. Cam 160' may include a set of cam grooves 164' defined therein. Grooves 164' may include longitudinal grooves 165' and angled grooves 166'. Grooves 164' may further include groove bottom end 167' and groove top end 168' (as viewed from the perspective of FIG. 16). Longitudinal grooves 165' may extend in a direction generally parallel to longitudinal axis A from groove top end 168' to groove bottom end 167'. Angled grooves 166' may extend from a common groove bottom end 167' to a different groove top end 168' at an oblique angle relative to longitudinal groove 165' and longitudinal axis A.

An alternately configured cam follower 170' may include a cam follower end 174' configured to track in cam grooves 164' during the indexing sequence of dimpler 100, as shown, for example, in FIGS. 23 and 25. Follower end 174' of cam follower 170' may contact one or more surfaces of cam grooves 164'. Follower end 174' may be contoured to generally match the contour of cam grooves 164'. Cam grooves 164' and cam follower end 174' may include mating, generally conical surfaces. Due to the biasing force of cam follower biasing member 172, cam follower end 174' is biased a direction substantially perpendicular to longitudinal axis A to maintain cam follower end 174' in contact with cam grooves 164'.

The depths of cam grooves 164' may vary along a length of the grooves. For example, longitudinal grooves 165' may have substantially the same depth as groove top end 168' but increase in depth at groove bottom end 167'. Groove bottom end 167' may have a depth greater than groove top end 168'. Angled grooves 166' may have a depth that gradually decreases from groove bottom end 167' to groove top end 168'. There may be a generally abrupt change in depth of cam grooves 164' where longitudinal groove 165' adjoins angled groove 166' at groove bottom end 167'. The change in depth occurring between longitudinal grooves 165' and angled grooves 166' at groove bottom end 167' defines a step 169', at which point the depth of longitudinal groove 165' changes to the depth of groove bottom end 167'.

Figure 17:
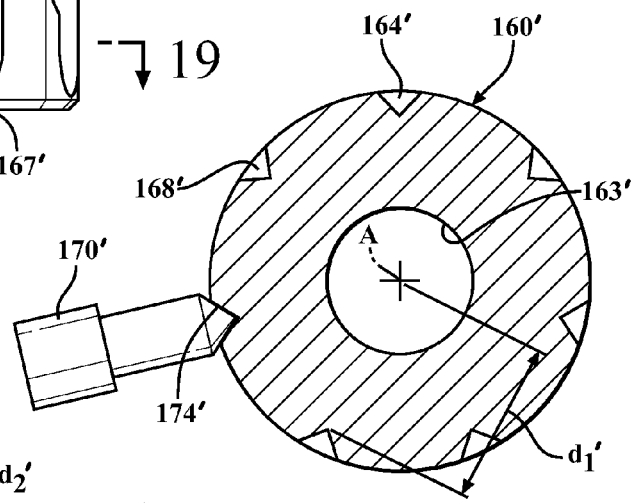
FIG. 17 is a partial sectional view of the dimpler cam of FIG. 16 taken along section line 17-17 in FIG. 16.
Figure 18:
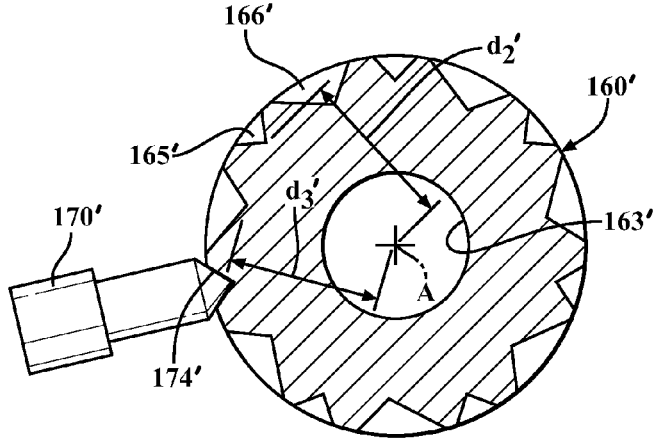
FIG. 18 is a partial sectional view of the dimpler cam of FIG. 16 taken along section line 18-18 of FIG. 16.
Figure 19:
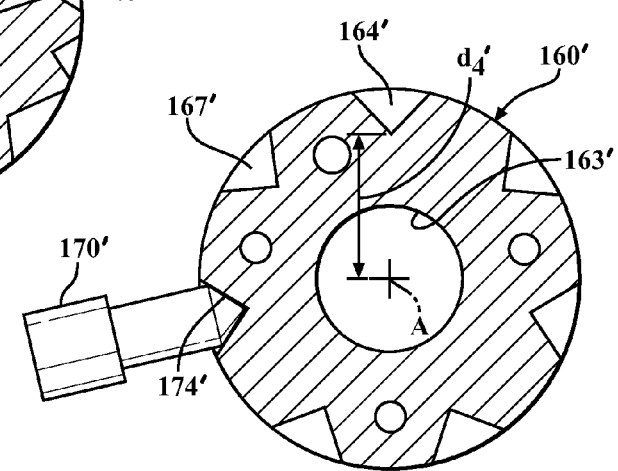
FIG. 19 is a partial sectional view of the dimpler cam of FIG. 16 taken along section line 19-19 of FIG. 16.
Figure 20:
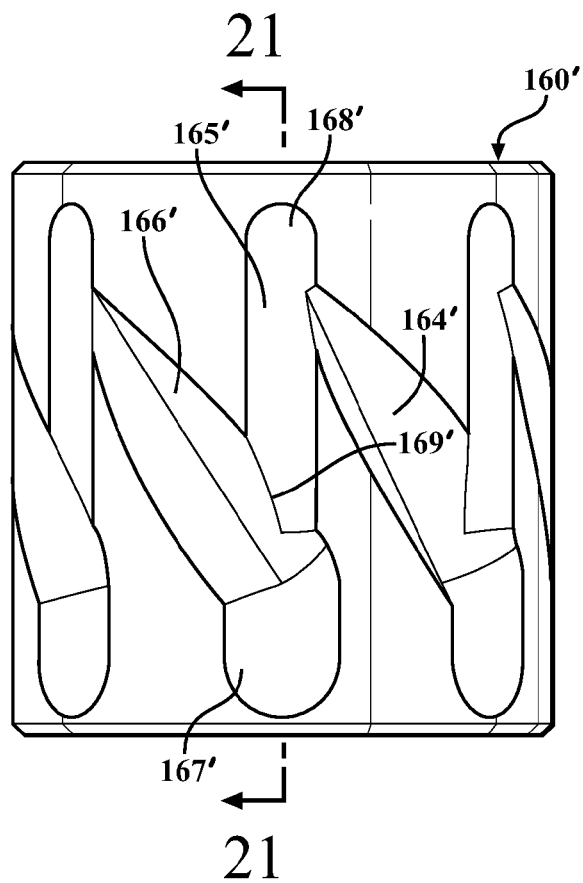
FIG. 20 is a side view of the dimpler cam of FIG. 16.
Figure 21:
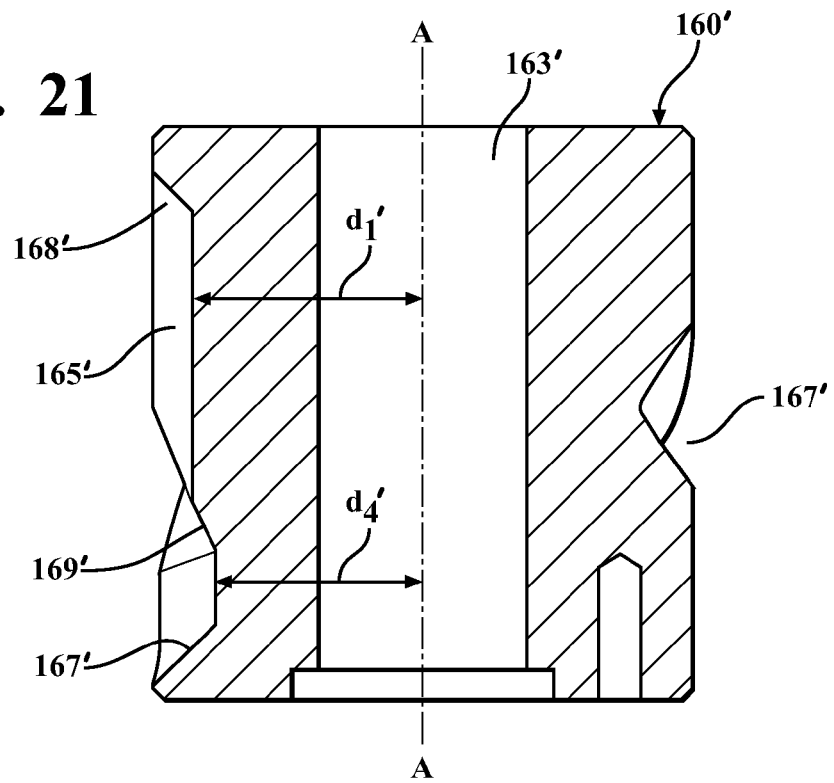
FIG. 21 is a partial sectional view of the dimpler cam of FIG. 16 taken along section line 21-21 of FIG. 20.

FIGS. 17-19 each illustrate a partial sectional view of cam 160' along with cam follower 170'. FIG. 17 illustrates cam follower end 174' within groove 164' positioned proximate to groove top end 168'. As illustrated in FIG. 17, groove top end 168' may have a groove depth such that a groove distance can be defined as a distance between longitudinal axis A and groove 164'. The groove distance at groove top end 168' is denoted as groove distance d1'.

FIG. 18 illustrated cam follower end 174' positioned longitudinal groove 165' at a location between groove bottom end 167' and groove top end 168'. Both longitudinal grooves 165' and angled grooves 166' are viewable in FIG. 18. As shown in FIG. 18, longitudinal grooves 165' have a groove distance of d2' and angled grooves 166' have a groove distance d3' at the particular cross-sectional location. If longitudinal grooves 165' are a constant depth, groove distance d2' may be substantially equal to groove distance d1'. Angled groove 166' may have a greater depth than longitudinal groove 165' at this cross-sectional location, thus groove distance d3' may be less than groove distance d2'.

FIG. 19 illustrates cam follower end 174' positioned at groove bottom end 167'. Groove distance d4' of groove bottom end 167' is less than the groove distance of longitudinal groove 165', as the depth of cam grooves 164' may be the greatest at groove bottom end 167'. Cam 160' causes cam follower end 174' to track along longitudinal groove 165' from groove top end 168' to groove bottom end 167' as the piston 130 is moved from the extended position to the compressed position. When piston 130 is at or near the fully compressed position, cam follower end 174' is positioned at or near the deeper groove bottom end 167'. The cam follower biasing member 172 biases the cam follower 170' radially inward to maintain contact between cam follower end 174' and the groove surface. Moving piston 130 from the compressed position toward the extended position causes the cam follower 170' to track along angled groove 166'. The cam follower 170' may move gradually outward in a radial direction as the depth of the angled groove 166' decreases moving from groove bottom end 167' to groove top end 168'. Because of the change in depth occurring at step 169' between longitudinal groove 165' and angled groove 165' at groove bottom end 167', cam follower 170' is moved along angled groove 166' rather than longitudinal groove 165' as piston 130 is moved from the compressed position toward the extended position.

Figure 22:
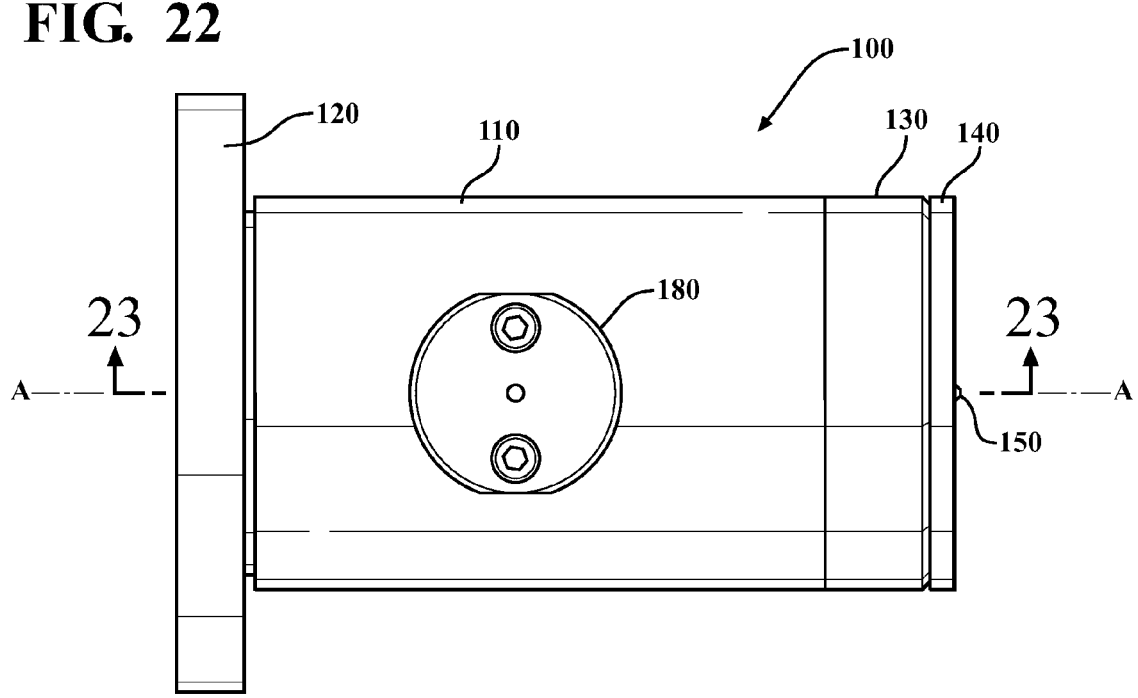
FIG. 22 is a side view of the dimpler of FIG. 1 arranged in a compressed position.

Operation of the dimpler 100 is described with reference to FIGS. 22-26. FIGS. 22 and 23 illustrate dimpler 100 in a fully compressed position with piston 130 abutting housing 110. Moving the piston 130 from the extended position (see for example FIGS. 1-9) to the compressed position causes cam follower end 174 of cam follower 170 to track along longitudinal groove 165 from groove top end 168 to groove bottom end 167, as shown, for example, in FIGS. 10 thru 13.

Figure 24:
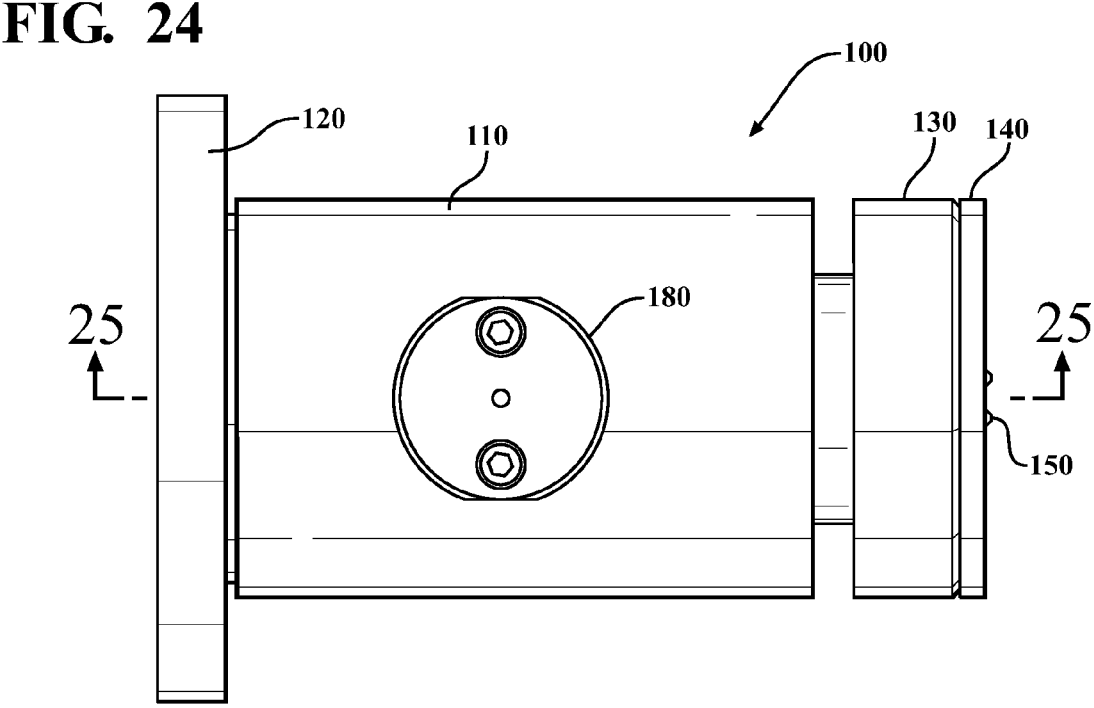
FIG. 24 is a side view of the dimpler of FIG. 1 arranged in a partially extended position.

FIGS. 24 and 25 illustrate the dimpler 100 in a partially extended position. In FIG. 25 cam follower end 174 is positioned within cam groove 165 adjacent step 169. Compressing the piston further toward the fully compressed position from the location illustrated in FIG. 25 causes cam follower end 174 to pass over step 169 and drop into angled groove 166. Once positioned in angled groove 166, step 169 blocks cam follower end 174 from tracking back along longitudinal groove 165 as piston 130 is moved from the fully compressed position to the extended position. Moving the piston 130 longitudinally away from housing 110 toward the extended position causes cam follower end 174 to track along angled groove 166 of cam 160. Because angled groove 166 is oriented at an oblique angle to longitudinal axis A from groove bottom end 167 to groove top end 168, cam 160 and piston 130 are caused to rotate about longitudinal axis A (see for example FIG. 1) as the piston 130 moves from the compressed position to the extended position and cam follower end 174 tracks along groove 166.

Rotating cam 160 and piston 130 about longitudinal axis A causes the dimpler 100 to index the dimples 150 to another dimpler angular position. Indexing occurs when moving piston 130 from the fully compressed position, as illustrated for example in FIGS. 22 and 23, toward the extended position, as illustrate for example in FIG. 6, which causes cam follower end 174 of cam follower 170 to track along angled groove 166 of cam 160. This causes cam 160 and piston 130 to concurrently rotate about axis A (see FIG. 1) by a predetermined angular shift 190. For example, moving piston 130 moves towards base plate 120 from groove top end 168 causes the cam follower end 174 to track along longitudinal groove 165 toward groove bottom end 167. Since longitudinal groove 165 is aligned generally parallel to longitudinal axis A, moving piston 130 from the extended position to the compressed position does not cause the piston to rotate about the longitudinal axis A as cam follower end 174 tracks along longitudinal groove 165. Alternatively, other cam configurations may also be employed, for example, which enable dimpler 100 to index upon moving the piston 130 from the extended position toward the compressed position, or that enable dimpler 100 to index both when moving the piston 130 toward the compressed position and toward the extended position.

Figure 26:
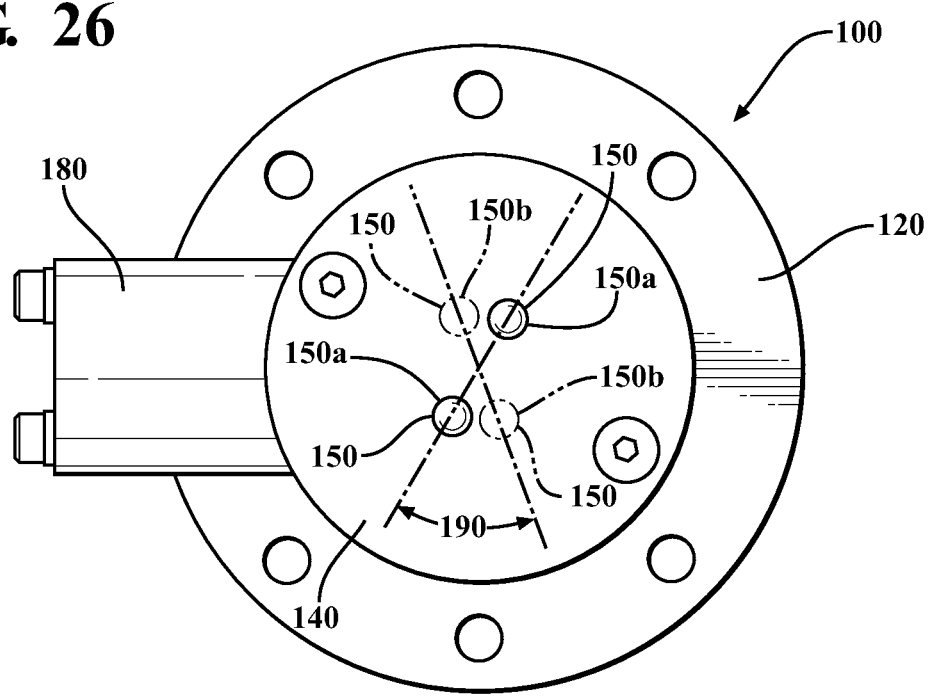
FIG. 26 is an end view of the dimpler of FIG. 1.

FIG. 26 is an end view of dimpler 100 illustrating a pair of dimples 150 arranged in a first index position 150a and a second index position 150b. Dimples 150a represent a position of dimples 150 in a first index position, and dimples 150b represent the position of dimples 150 in a second index position after the dimpler 100 has completed an indexing sequence. Each indexing sequence causes the dimples 150 to rotate about the longitudinal axis A by angular increment 190. The illustrated exemplary configuration of cam 160 provides for a total of seven distinct indexing locations corresponding to a total of seven longitudinal grooves 164. For example, cam 160 may include cam grooves 164 that include seven discrete groove bottom ends 167 and seven discrete groove top ends 168. With seven indexing positions the orientation of dimples 150 in the second index position 150b may be angularly shifted by approximately 51 degrees from dimples 150 arrange in the first index position 150a. It is contemplated that cam 160 may be configured to index the dimpler in a varying number of unique positions, thus the orientations of sequentially indexed dimples 150 may be varied. It will be understood that the construction of the dimpler 100 and cam 160 may be varied to provide for a greater or smaller range of motion for the piston 130 and/or to provide fewer or more indexing positions for dimples 150. The illustrated exemplary dimpler 100 is shown having two dimples 150, but alternatively fewer or more dimples 150 may be employed.

Dimpler 100 may be incorporated into a stamping die such that base plate 120 is attached to one portion of the stamping die. Dimples 150 may contact a portion of a workpiece blank being cut or shaped by the stamping die. The force of the stamping die may press the workpiece against dimples 150, and thereby forcibly move piston 130 into the compressed position. The piston 130 may contact housing 110 in the compressed position. Upon the force being removed from the stamping dies, the dimpler 100 may extend into the extended position while indexing to the next dimple index location. Although the illustrated examples of dimpler 100 are not shown to include pneumatic, hydraulic or electrical inputs, it is nevertheless contemplated that alternate configurations of dimpler 100 may include such systems to independently power dimpler 100.

Figure 27:
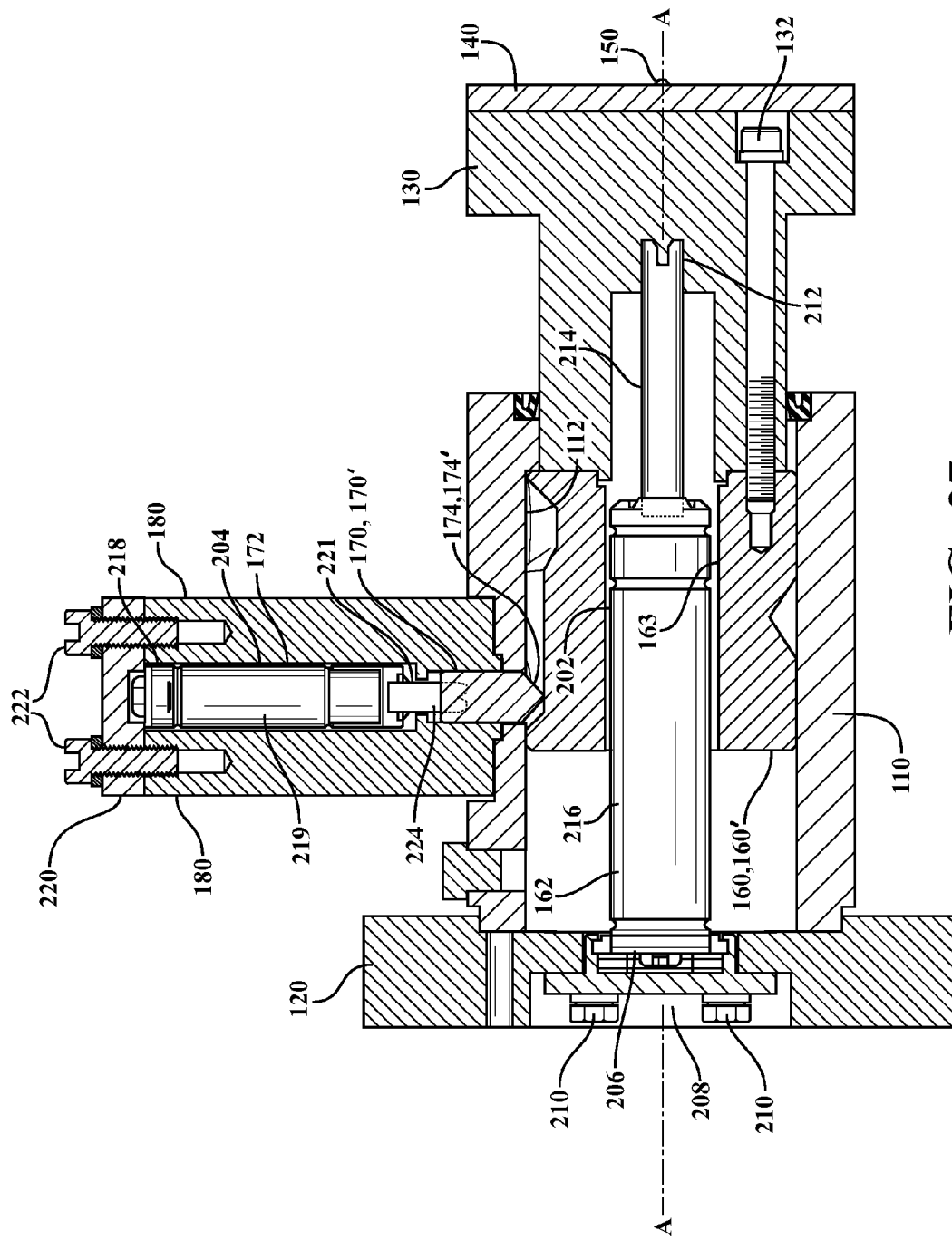
FIG. 27 is a partial cross section view of a alternately configured dimpler employing an air spring for actuating a dimpler piston and an air spring for biasing a cam follower.
Figure 28:
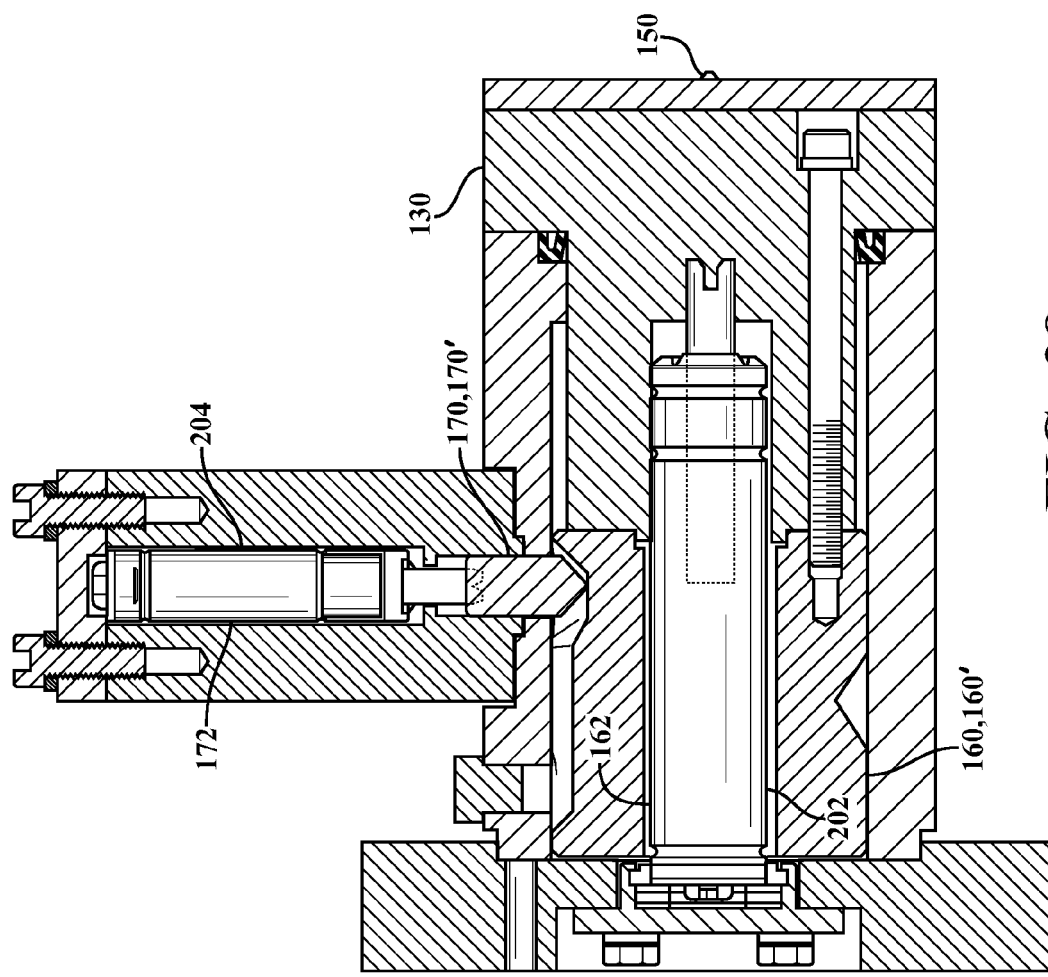
FIG. 28 is a partial sectional view of the dimpler of FIG. 27 arranged in a compressed position.

[ADD DESCRIPTION OF AIR SPRING] With reference to FIGS. 27 and 28, an alternately configured automatic indexing dimpler 200 may include cam biasing member 162 and cam follower biasing member 172 configured as air springs. Cam biasing member 162 may include a cam air spring 202 and cam follower biasing member 172 may include a cam follower air spring 204. Dimpler 200 is otherwise configured substantially the same as dimpler 100. For example, dimpler 200 may generally include dimpler housing 110, base plate 120 modified to connect to an end 206 of cam air spring 202, piston 130, face plate 140, dimples 150, cam 160/160', cam follower 170/170', and cam follower housing 180. Dimpler 200 may employ cam 160 or 160', or differently configured cam. Piston 130 is configured to travel between the extended position, as illustrated for example in FIG. 27, and the compressed position, as illustrated for example in FIG. 28. Dimpler 200 operates in substantially the same manner as dimpler 100.

Base plate 120 may be fixedly attached to the housing 110, or may alternatively be integrally formed with housing 110. Cam air spring 202 may be attached to the base plate 120 by a bracket 208 that attaches to end 206 of the cam air spring 202. The bracket 208 may be attached to base plate 120 using one or more fasteners 210.

Piston 130 may be secured to face plate 140 by face plate fasteners 142 (see for example FIG. 1). Dimples 150 project outward from face plate 140 and may be secured to face plate 140 by trapping the dimples 150 between piston 130 and face plate 140. The dimples 150 may be offset a distance "d" from a longitudinal axis A of the dimpler 100 (see for example FIG. 4). Each dimple 150 may be offset from the longitudinal axis A by substantially the same distance "d" or one or more dimples may be offset by a different distance.

Piston 130 may be secured to cam 160/160' by cam fasteners 132. Cam 160/160' and piston 130 are fixedly attached to one another so as to move in unison with one another. The cam 160/160' and piston 130 are both concurrently rotatable about and moveable axially along the longitudinal axis A.

Cam follower 170/170' includes cam follower end 174/174' that may be biased into engagement with cam 160/160' by cam follower air spring 204. The cam follower housing 180 may be configured for attachment to housing 110 using fasteners 182.

Cam 160/160' may be slidably and rotatably disposed within the interior channel 112 of housing 110 and may be configured to move rotationally about longitudinal axis A as well as translationally along longitudinal axis A. The piston 130 may be fixedly secured to cam 160/160' by cam fasteners 132.

The aperture 163 extending through cam 160/160' may be sized to allow cam air spring 202 to fit within aperture 163. Aperture 163 may be centered on longitudinal axis A. The cam air spring 202 may include a cam air spring body 216 and a cam air spring shaft 214 that is slidably received within the cam air spring body 216. An end 212 of the cam air spring shaft 214 engages piston 130 and the end 206 of the cam air spring body 216 attaches to base plate 120. The cam air spring 202 extends through aperture 163 in cam 160/160'. The cam air spring 202 operates to bias piston 130 toward the extended position (as shown for example in FIG. 27) and resists movement of piston 130 toward the compressed position (as shown for example in FIG. 28).

Cam follower 170/170' may be biased toward an interior of housing 110 by cam follower air spring 204. Cam follower air spring may include a cam follower air spring housing 219 and a cam follower air spring shaft 221 slidably disposed within the cam follower air spring housing 219. One end 218 of cam follower air spring 206 may be attached to a bracket 220, which itself may be attached to cam follower housing 180 using one or more fasteners 222. An end 224 of cam follower air spring shaft 221 may attach to cam follower 170/170'. Cam follower air spring 204 operates to bias cam follower 170/170' into engagement with cam 160/160'.

Examples described herein may be suitable for stamping workpieces of a variety of size, shape and material. For example, dimpler 100 may be suitable for creating dimples in aluminum, cold-rolled steel, and hot-rolled steel workpieces. Depending on the desired workpieces, the materials of dimpler 100 may be varied, such as choosing stronger steel material for dimples 150 for use on higher strength or thicker workpieces.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automatic indexing dimpler comprising:
    a housing including an interior channel substantially centered along a longitudinal axis;
    a cam disposed within the interior channel, the cam slidable along and rotatable about the longitudinal axis and including a first longitudinal groove, a second longitudinal groove and an angled groove adjoining the first longitudinal groove at a groove bottom end and the second longitudinal groove at a groove top end, the first and second longitudinal grooves axially aligned substantially parallel to the longitudinal axis and the angled groove oriented at an oblique angle relative to the longitudinal axis, each longitudinal groove defining a discrete indexing position;
    a cam follower attached to the housing and including a cam follower end slidably engaging the first and second longitudinal grooves and the angled groove, the cam follower operable to rotate the cam about the longitudinal axis as the cam follower end tracks along the angled groove from the groove bottom end to the groove top end; and
    at least one dimple engagable with a workpiece and operable for forming a recessed region in the workpiece, the at least one dimple operably connected to the cam for concurrent rotational and axial movement therewith about and along the longitudinal axis.

2. The dimpler of claim 1 further comprising a piston having a first end fixedly attached to the cam for concurrent movement therewith and a second end attached to the at least one dimple, the at least one dimple moving in substantial unison with the piston.

3. The dimpler of claim 2, wherein the piston and cam are moveable between an extended position and a compressed position.

4. The dimpler of claim 3, wherein the at least one dimple is rotatable about the longitudinal axis between a first angular location and a second angular location, the at least one dimple located in the first angular position when the cam follower engages the first longitudinal groove and the second angular location when the cam follower engages the second longitudinal groove.

5. The dimpler of claim 3, wherein the cam follower is positioned at the groove top end when the piston is arranged in the extended position and the groove bottom end when the piston is arranged in the compressed position.

6. The dimpler of claim 3 further comprising:
    a baseplate fixedly attached to an end of the housing; and
    a cam biasing member having one end engaging the base plate and an opposite end engaging the piston, the biasing member operable to urge the piston away from the compressed position and toward the extended position.

7. The dimpler of claim 6, wherein the biasing member is one of a coil spring and an air spring.

8. The dimpler of claim 1, wherein the cam follower is moveable radially relative to the longitudinal axis and is substantially fixed relative to the housing in all other directions.

9. The dimpler of claim 8 further comprising;
    a cam follower housing fixedly attached to the housing and including a cam follower channel, the cam follower slidably received within the cam follower channel; and
    a cam follower biasing member having one end engaging the cam follower and an opposite end engaging the cam follower housing, the cam follower biasing member operable to urge the cam follower into engagement with the cam.

10. The dimpler of claim 1, wherein a first radial distance between the groove bottom end and the longitudinal axis is less than a second radial distance between the groove top end and the longitudinal axis.

11. The dimpler of claim 10 further comprising a step defining a transition between the first longitudinal groove and the angled groove, wherein a radial distance from the first longitudinal groove adjacent the step to the longitudinal axis is greater than a radial distance from the angled groove adjacent the step to the longitudinal axis, the step operable to prevent the cam follower from tracking along the first longitudinal groove when the cam follower is positioned at the groove bottom end.

12. The dimpler of claim 1, wherein the at least one dimple is offset radially from the longitudinal axis.

13. An automatic indexing dimpler comprising:
a housing including an interior channel substantially centered along a longitudinal axis;
a cam disposed within the interior channel and slidable along and rotatable about the longitudinal axis relative to the housing, the cam including cam grooves;
a cam follower attached to the housing and including a cam follower end engaging the cam grooves;
a piston fixedly attached to the cam for concurrent axial and rotational movement therewith, the piston moveable between an extended position and a compressed position, wherein the cam follower tracks the cam grooves in response to movement of the piston between the extended and compressed positions; and
at least one dimple engagable with a workpiece and operable for forming a recessed region in the workpiece, the at least one dimple attached to the piston for concurrent movement therewith, the dimple offset radially from longitudinal axis.

14. The dimpler of claim 13, wherein the cam grooves include a first longitudinal groove, a second longitudinal groove spaced from and aligned substantially parallel to the first longitudinal groove, and an angled groove adjoining the first longitudinal groove at a groove bottom end and the second longitudinal groove at a groove top end, the angled groove oriented at an oblique angle relative to the longitudinal axis.

15. The dimpler of claim 14, wherein the cam follower is positioned at the groove bottom end when the piston is in the compressed position and is positioned at the groove top end when the piston is in the extended position.

16. The dimpler of claim 14, wherein the dimples are rotatable about the longitudinal axis between a first angular position and a second angular position in response to movement of the cam follower along the angled groove.

17. The dimpler of claim 14, wherein the cam grooves include a step transitioning between the first longitudinal groove and the angled groove located proximate the groove bottom end.

18. The dimpler of claim 17, wherein a distance between the first longitudinal groove adjacent the step and the longitudinal axis is greater than a distance between the angled groove adjacent the step and the longitudinal axis.

19. The dimpler of claim 13, further comprising:
a base plate fixedly attached to the housing opposite the piston, wherein the housing is disposed axially along the longitudinal axis between the base plate and the piston; and
a cam biasing member having one end engaging the base plate and an opposite end engaging the piston, the cam biasing member operable to urge the piston toward the extended position.

* * * * *